(No Model.)
H. A. MOYER.
SPRING VEHICLE.
No. 396,223. Patented Jan. 15, 1889.
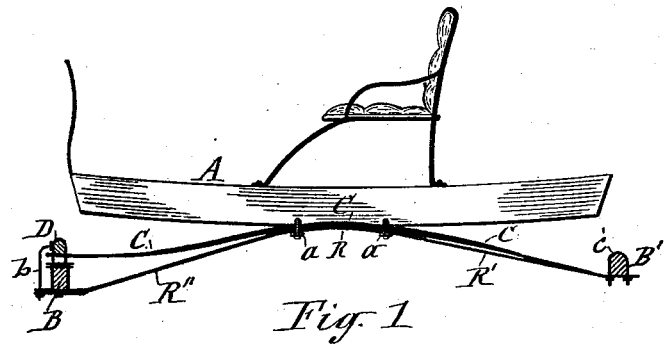
Fig. 1
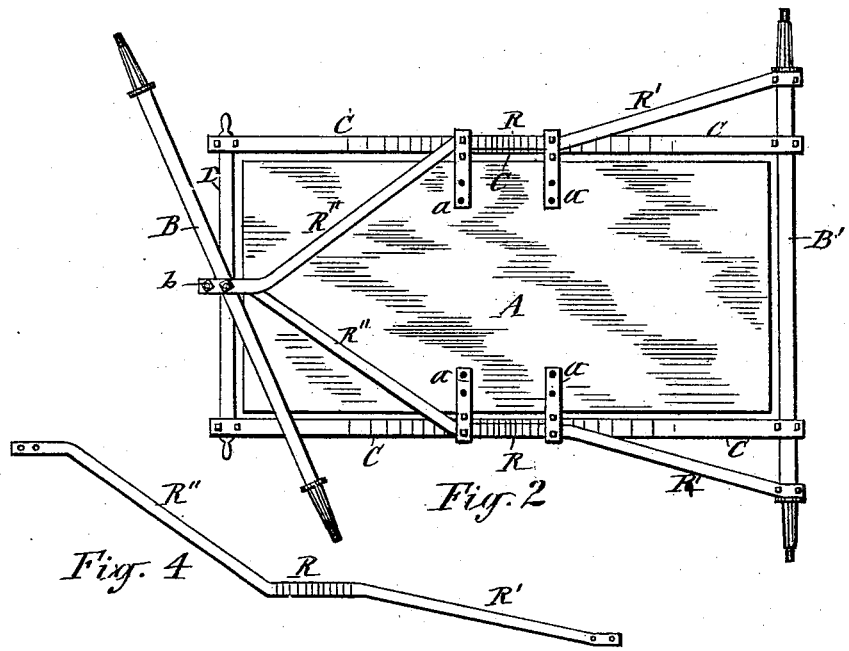
Fig. 2
Fig. 4
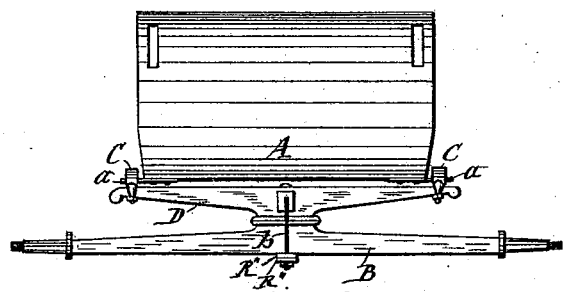
Fig. 3
WITNESSES:
A. F. Walz
W. H. Randall.
INVENTOR:
Harvey A. Moyer
BY
Duell, Laass & Duell
ATTORNEYS.

UNITED STATES PATENT OFFICE.

HARVEY A. MOYER, OF SYRACUSE, NEW YORK.

SPRING-VEHICLE.

SPECIFICATION forming part of Letters Patent No. 396,223, dated January 15, 1889.

Application filed September 27, 1888. Serial No. 286,543. (No model.)

*To all whom it may concern:*

Be it known that I, HARVEY A. MOYER, of Syracuse, in the county of Onondaga, in the State of New York, have invented new and useful Improvements in Spring-Vehicles, of which the following, taken in connection with the accompanying drawings, is a full, clear, and exact description.

This invention relates to the connection of the hind axle with the forward running-gear of a side-spring vehicle; and it consists in the novel construction of two reaches connected with the side springs, as hereinafter fully described, and specifically set forth in the claims.

In the annexed drawings, Figure 1 is a side view of that portion of a vehicle to which my invention is applied. Fig. 2 is an inverted plan view of the same with the front axle swung into such an angle as to show the connection of the springs with the head-block. Fig. 3 is a front view of the aforesaid portion of the vehicle, and Fig. 4 is a detached plan view of one of the reaches.

Similar letters of reference indicate corresponding parts.

B and B' represent, respectively, the front and rear axles of the vehicle. A denotes the body, which may be of any suitable form, and C C are the side springs, which are connected in the usual and well-known manner to the hind axle and to the head-block D, the body being supported on the central portions of the said side springs either by short straps *a a*, secured to the under side of the body and extending across the under side of the side springs and clipped thereon, as shown, or by cross-bars extending across the under side of the body and fastened thereto and secured to the side springs, as aforesaid. The two running-gears of the aforesaid vehicle I connect by two metallic reaches, each formed with a central portion, R, which lies on the under side of the central portion of one of the side springs C, parallel therewith and connected thereto by the straps *a a*, extending across the under side of said portion of the reach, and the clips embracing the spring and reach and fastening the same to the straps *a a*. The rear end portions, R' R', of the two reaches are formed diverging from each other and are firmly secured to the end portions of the hind axle by clips *c c*, embracing the axle. The front end portions, R'' R'', of the reaches are formed converging to the center of the front axle, B, and are conjointly pivotally connected thereto by the king-bolt passing through the end portions of the reaches, which lie one upon the other at their intersection underneath the axle and project at the front of the axle sufficiently to receive through them the lower end of the brace *b*, the upper end of which is secured to the head-block D.

Although I prefer to form each of the described reaches in one piece, yet I do not wish to be limited to such construction, inasmuch as the end portions, R' R'', may be formed separately and each with a central portion, R, by which they may be lapped one over the other and fastened to the under side of the side spring in the manner hereinbefore described.

Having described my invention, what I claim as new, and desire to secure by Letters Patent, is—

1. In combination with the running-gear and side springs, reaches extending to the central portions of the side springs and lying on the under side thereof, body-supporting bars extending across the under side of the reaches at their junction with the side springs, and clips embracing the springs and underlying reaches and fastened to the body-supporting bars, substantially as set forth and shown.

2. In combination with the running-gear and side springs, the front end portions, R'' R'', of the reaches contiguous to the under side of the central portions of the springs, the body-supporting bars *a a*, extending across the under side of said portions of the reaches, and clips embracing the springs and underlying portions of the reaches and fastened to the bars *a a*, substantially as described and shown.

3. In combination with the running-gear and side springs, the front end portions, R'' R'', of the reaches lying contiguous to the under side of the central portions of the springs and fastened thereto and having their front extremities passing under the front axle, and the king-bolt passing through them, substantially as described and shown.

4. In combination with the running-gear and side springs, the front end portions, R″ R″, of the reaches lying contiguous to the under side of the central portions of the springs and secured thereto and having their front extremities lapping one upon the other underneath the front axle, and the king-bolt passing through the lapping portions of the reach portions R″ R″, substantially as described and shown.

5. In combination with the running-gear and side springs, the front end portions, R″ R″, of the reaches lying contiguous to the under side of the central portions of the side springs and secured thereto, and having the front extremities lapping one upon the other and extending under the axle and forward therefrom, and the king-bolt and brace $b$, passing through said lapping portions of the reach portions R″ R″, substantially as described and shown.

6. In combination with the running-gear and side springs, two reaches, each formed in one piece, with the central portion, R, lying on the under side of the central portion of one of the springs and secured thereto, the rear end portion, R′, secured to the end portion of the rear axle, and the front end portion, R″, secured to the center of the front axle, substantially as described and shown.

7. In combination with the running-gear and side springs, two reaches, each formed in one piece, with the central portion, R, lying on the under side of the central portion of one of the springs and secured thereto, the rear end portion, R′, secured to the end portion of the rear axle, and the front end portion, R″, extending under the axle, said reaches having their front ends lapping one upon the other and the king-bolt passing through the same, substantially as described and shown.

8. In combination with the running-gear and side springs, two reaches, each formed in one piece, with the central portion, R, contiguous to and parallel with the under side of the central portion of one of the springs, the rear end portions, R′, secured to the end portion of the rear axle, the front end portion, R″, extending under the front axle and forward therefrom, said reaches having the front ends lapping one upon the other, and the king-bolt and brace $b$, passing through the lapping portions of the reaches, substantially as described and shown.

9. In combination with the running-gear and side springs, two reaches, each formed in one piece, with the central portion, R, contiguous to and parallel with the under side of one of the springs, the rear end portion, R′, secured to the end of the rear axle, and the front end portion, R″, extending under the axle and forward therefrom, said reaches having their front ends lapping one upon the other, the king-bolt and brace $b$, passing through the said lapping portions of the reaches, body-supporting bars $a\ a$, extending across the under sides of the central portions of the two reaches, and clips embracing the springs and underlying portions of the reaches and secured to the bars $a\ a$, substantially as described and shown.

In testimony whereof I have hereunto signed my name, in the presence of two witnesses, at Syracuse, in the county of Onondaga, in the State of New York, this 24th day of September, 1888.

HARVEY A. MOYER. [L. S.]

Witnesses:
  C. H. DUELL,
  H. M. SEAMANS.